United States Patent

[11] 3,609,399

[72] Inventors Masafumi Hanaoka;
Yasuo Minowa, both of Tokyo, Japan
[21] Appl. No. 5,804
[22] Filed Jan. 26, 1970
[45] Patented Sept. 28, 1971
[73] Assignee Nippon Electric Company, Limited
Tokyo, Japan
[32] Priority Jan. 31, 1969
[33] Japan
[31] 7687/69

[54] A TRICOLOR IMAGE PHOTODIODE PICKUP ARRAY

6 Claims, 4 Drawing Figs.

[52] U.S. Cl. 313/66, 317/235 N
[51] Int. Cl. H01j 31/30, H01l 15/02
[50] Field of Search 313/65 T, 65 AB; 317/235 N

*Primary Examiner*—Roy Lake
*Assistant Examiner*—V. Lafranchi
*Attorney*—Sandoe, Hopgood and Calimafde

ABSTRACT: An improved target device for a tricolor image pickup device comprises a photodiode-array formed on one surface of a substrate. A transparent insulator layer is formed on the other surface of the substrate and a plurality of transparent electrodes on which filters are mounted, are mounted on the insulator layer at locations corresponding to the photodiode-array.

INVENTORS
Masafumi Hanaoka
Yasuo Minowa
by
Sandoe, Hopgood & Calimafde
ATTORNEYS

*INVENTORS*
Masafumi Hanaoka
Yasuo Minowa
*by*
Sandoe, Hopgood & Calimafde
ATTORNEYS

A TRICOLOR IMAGE PHOTODIODE PICKUP ARRAY

This invention relates generally to tricolor image pickup devices and, more particularly, to a diode-array target device for use in a tricolor image pickup tube or in a solid-state image pickup device.

A conventional color television camera employs three image pickup tubes, and a trichroic filter or prism for dividing a light beam incident on the tube into its three primary color, to wit, red, green and blue, components. The separated color components are respectively projected onto the targets of the pickup tubes and are converted into electrical signals. In a conventional camera structure of this type, the tricolor image pickup device is very difficult to miniaturize, because of the requirement for three pickup tubes. Moreover, in the prior art color cameras, a complicated trichroic optical system is needed for separating each picture element into its three primary color components. Furthermore, a complicated electronic circuit, called a registration circuit, is employed in the known pickup devices to prevent color-shifting or, in other words, to ensure the synchronization of the scanning of the three separated optical images of the different color components. In summary, the known color television camera is very costly to manufacture.

To overcome these difficulties, various proposals have been made which employ a single pickup tube and dispenses with the trichroic optical system and the registration circuit. However, prior art devices of the single pickup tube type do not exhibit a satisfactorily high opto-electrical conversion efficiency.

It is an object of the present invention to provide a diode-array-type target device for a single pickup tube camera of high color reproducibility and high conversion efficiency.

According to the present invention, an improved diode-array target device for a tricolor image pickup device is provided, which comprises a semiconductor substrate of one conductivity type and a photodiode-array formed by diffusing impurities of the opposite conductivity type into the matrix-arranged points on one major surface of the substrate. A transparent insulator layer is formed on the other surface of that substrate and a plurality of transparent electrodes are mounted on the insulator layer at each point corresponding to the photodiode-array. A number of strip-line-shaped filters is mounted on the transparent electrodes to detect red, green and blue color components.

Figures 1, 2:
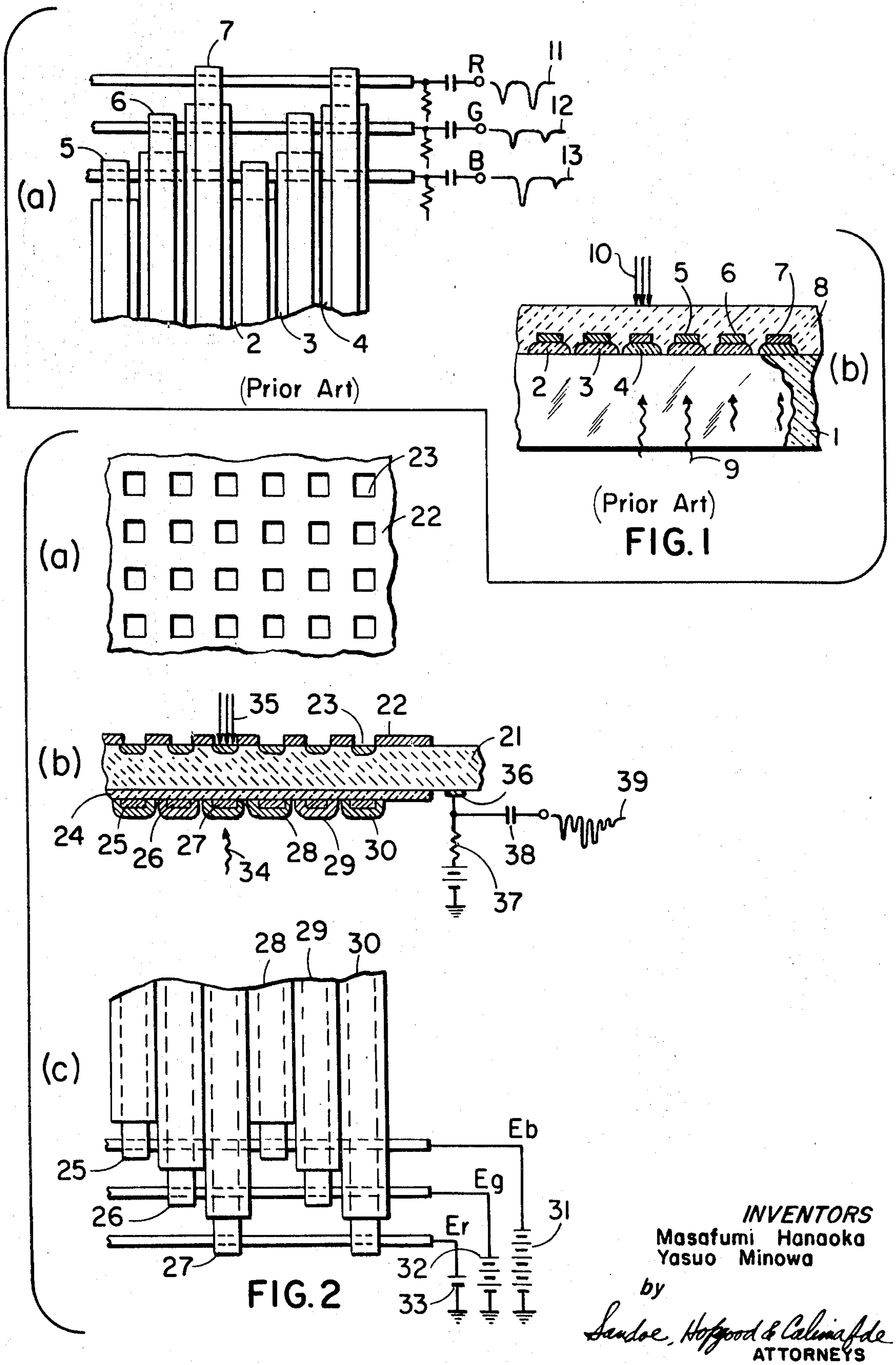
Figures 3, 4:
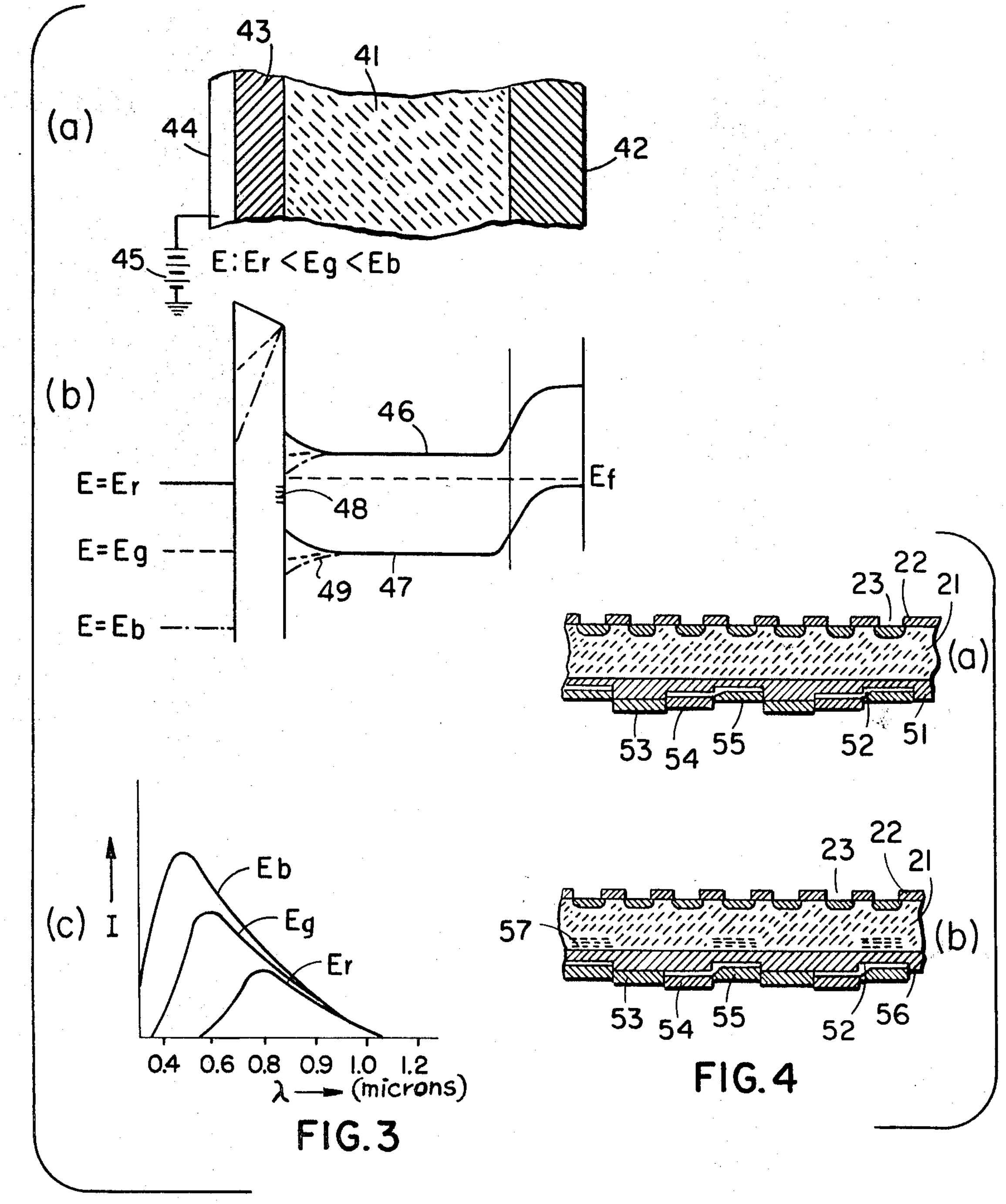

To the accomplishment of the above and to such further objects as may hereinafter appear, the present invention relates to a tricolor image pickup device substantially as defined in the appended claims and as described in the following specification, taken in conjunction with the accompanying drawings, in which;

FIGS. 1(*a*) and (*b*) are respectively plan and cross-sectional views of a target electrode arrangement employed in a conventional tricolor vidicon;

FIG. 2(*a*) is a fragmentary plan view of one major surface of the tricolor image pickup device according to one embodiment of the present invention;

FIG. 2(*b*) is a cross-sectional view of the device of FIG. 2(*a*);

FIG. 2(*c*) is a fragmentary plan view of the other major surface of the device of FIG. 2(*a*);

FIGS. 3(*a*)–(*c*) illustrate graphically the energy levels and sensitivity characteristics of the one-dimensional model for describing the operation and effectiveness of the pickup device of the present invention; and FIGS. 4(*a*) and (*b*) show pickup devices according to other embodiments of the present invention.

The conventional target device illustrated in FIGS. 1 (*a*) and (*b*) is composed of a transparent faceplate 1, to which strip-shaped red, green and blue optical filters 2, 3 and 4, are attached. Strip-shaped transparent electrodes 5, 6 and 7 of conductive material such as NESA are respectively attached to filters 2, 3 and 4, and a layer 8 of photoconductive material such as antimony tri-sulfide is formed covering the electrodes, 5, 6 and 7 through an evaporation process. As shown in FIG. 1(*a*), the transparent electrodes 5, 6 and 7 are mutually coupled into three groups corresponding to the red, green and blue components, by means of three separate conductors connected to the terminals R, G and B, respectively. The color signals are produced by the scanning by an electron beam 10, across the load resistors and are derived at terminals R, G and B through the capacitors shown in FIG. 1(*a*). The instantaneous value of each of the video signals represents the intensity of the incident light beam 9 on faceplate 1, as a result of the photoconductive property of layer 8. The waveforms of the red, green and blue video signals are respectively indicated by the signal waveforms 11, 12 and 13 in FIG. 1(*a*). One of the defects of this conventional target device for a tricolor vidicon tube is the relatively low efficiency of opto-electrical conversion compared with a three pickup tube system, because the green and blue components, for example, of the light beam incident upon the red filter portion do not contribute to the generation of the video signal. Moreover, a serious defect of the conventional target device of FIG. 1 lies in the appreciable level of crosstalk between the electrodes 5, 6 and 7 which results from the stray capacitance existing between these electrodes. If the load resistance would be set at a low value with a view toward reducing this adverse crosstalk effect, the signal to noise ratio would be inevitably, adversely affected.

Recently, a novel target device comprising a photodiode-array formed in a semiconductor single crystal substrate, which does away with the evaporated photoconductive layer employed in the conventional device, has been put into practical use (See "Bell Laboratories Record," June, 1967, pages 175–179 or U.S. Pat. No. 3,403,284). This structure significantly lessens the afterimage as compared with the conventional target devices.

The present invention is based on the application of the principle of a photodiode-array-type image pickup device to a tricolor image pickup device.

Referring to FIGS. 2(*a*), 2(*b*) and 2(*c*), an insulator film 22 such as an $SiO_2$ film, is formed on one major surface of a silicon single crystal substrate 21. A number of openings 23 arranged in rows and columns are formed in film 22 by means, for example, of a photoetching process. Through these openings, impurities of an opposite conductivity type are diffused into substrate 21 to thereby form a two-dimensional diode-array. On the other major surface of substrate 21, a high quality transparent insulator layer 24, formed of material such as $SiO_2$ or $Si_3N_4$, is attached, and transparent strip-line-shaped electrodes 25, 26 and 27 are then mounted upon layer 24 at those positions corresponding to the respective diodes on the matrix. Red, green and blue filters 28, 29 and 30 are respectively attached to electrodes 25, 26 and 27, and voltages $E_b$, $E_g$ and $E_r$ are derived from the voltage sources 31, 32 and 33, are respectively applied to electrodes 25, 26 and 27 as shown in FIG. 2(*c*).

The application of different level voltages $E_r$, $E_g$, and $E_b$ to the transparent electrodes 25, 26 and 27 is aimed at the utilization of the difference in the photoelectric conversion efficiency depending on the wavelengths of the incident light beam 34.

Referring to FIG. 3(*a*) which illustrates a one-dimensional model of the target device shown in FIG. 2(*b*), an N-type silicon substrate 41 (corresponding to substrate 21) has a P-type impurity-diffused region 43 (corresponding to the P-type diffusion region 23). The front surface of substrate 41 is covered with a high quality transparent insulative layer 42 (corresponding to layer 24). A transparent strip line such as electrode 44 (corresponding to electrode 25, 26 or 27) is formed on layer 43.

When viewed from the insulative film 43 in this structure, the energy level curve for the device exhibits the characteristics of an MIS (metal-insulator-semiconductor) structure.

Assuming that the relationship between the three different voltages $E_r$, $E_g$, and $E_b$, which are separately applied across electrode 44 and substrate 41, are $E_r<E_g<E_b$, the energy levels of the conduction band and valence-bond band are illustrated by curves 46 and 47 shown in the solid lines in FIG. 3(*b*). The energy level of substrate 41 in the vicinity of insulator layer 43 varies according to the applied voltage. The surface recombination occurs at a recombination center 48 (FIG. 3(*b*)) existing in the boundary layer between semiconductor substrate 41 and insulator 43. Assuming that the capture cross section of the recombination center 48 for the carrier is constant, the occurrence of the recombination depends on the carrier concentration. As the voltage applied to the insulator 43 is varied from $E_r$ to $E_g$ and $E_b$, the energy level 47 of the valence band varies, as shown by the broken lines in FIG. 3(*b*). Thus the drift electric field for driving holes toward the interior of the diode is formed in the semiconductor substrate 41 near insulator layer 43, with the result that the hole concentration in this portion is lowered. As a result, the surface recombination rate is decreased. Usually since the absorption coefficient of silicon crystal for a light beam of relatively short wavelength is relatively high, most of the holes 49 generated by the light beam exist in the vicinity of the semiconductor substrate surface. Therefore, the magnitude of the surface recombination rate significantly affects the spectral sensitivity in the short wavelength region of the diode.

The relationship between the spectral sensitivity and wavelength is illustrated graphically in FIG. 3(*c*) in which the applied voltage is employed as the variable parameter.

Referring again to FIG. 2(*b*), the transparent strip line electrodes 25, 26, 27, which correspond to the conductor film 44 of the model of FIG. 3(*a*), are coupled respectively to the DC power sources 31, 32, and 33, which are respectively at voltages $E_b$, $E_g$ and $E_r$. The difference in the applied voltages makes the target device sensitive to the various wavelength components as shown graphically in FIG. 3(*c*). However, the mere application of the different voltages $E_b$, $E_g$ and $E_r$ to the electrodes 25, 26 and 27 is not sufficient to provide the device with a color discrimination function. To make this function perfect, blue, green and red filters 28, 29, and 30 are attached respectively to transparent electrodes 25, 26 and 27.

The electron beam 35 is caused to scan the target device from the diode-array surface of substrate 21 perpendicularly to the plane thereof. The scanning electron beam serves as an electrical path instantaneously coupled to each of the diodes of the diode-array as described above. More particularly, the photoelectric current output representative of the luminance of the incident light beam 34 is derived from an ohmic electrode 36 as the voltage across a load resistor 37 at the time at which scanning electron beam 35 strikes the diode immediately beneath the point irradiated by the input light rays 34. The signal across resistor 37 is coupled through a capacitor 38 and is illustrated by the output signal waveform 39.

In another embodiment of a target device according to this invention shown in FIG. 4(*a*), the thickness of the insulator layer 51 covering one major surface of substrate 21 is changed discretely corresponding to the diode-array mounted on the opposite surface of the substrate 21 for respectively detecting red, green and blue components. Since the problem of the surface recombination is not serious for the red light detector, a red filter 53 is attached directly to layer 51. On the other hand, the green and blue detectors are composed of the strip-line-shaped filters 54 and 55, which are at least partly buried in layer 51 with transparent electrode 52 interposed therebetween. By suitably controlling the thickness of the insulator layer at each point corresponding to the location of the green and blue detectors, the same effectiveness and high conversion efficiency as shown in FIG. 3 can be obtained, even though an equal voltage is applied to all the electrodes, because the electric fields in the insulator layer are different from point to point.

Referring to the embodiment of the invention of FIG. 4(*b*), the target device illustrated therein comprises an insulator layer 56 of a discrete thickness, which is similar to the device of FIG. 4(*a*). In addition, the concentration gradient of impurities of the same conductivity type as substrate 21 is provided beneath the surface of insulator layer 56 corresponding to the positions of the photodiodes for blue light component. The strong drift electric field induced by this impurity concentration gradient enhances the effectiveness of the device in a manner similar to that described above. Thus, various modifications are possible in the target device of the invention by using the various combinations of the insulator layer and transparent electrode. Thus, while only several embodiments of the inventions are herein specifically described it will be apparent that many variations may be made therein without departing from the scope of the invention.

We claim:

1. A diode-array target device for a tricolor image pickup device comprising a semiconductor substrate of one conductivity type, an array of diffusion regions of opposite conductivity type formed on one major surface of said substrate, a transparent film of insulative material formed on the other major surface of said substrate, a plurality of strip-shaped transparent electrodes formed in parallel on said insulator film in alignment with said array, a plurality of filter means respectively covering said transparent electrodes for respectively detecting red, green and blue color components, means for connecting said electrodes into three groups each composed of selected ones of said electrodes and separated by a predetermined spacing, and output means in ohmic contact with said substrate.

2. The target device of claim 1, further comprising means for varying the electric field intensity beneath said electrodes between said groups.

3. The target device of claim 2, in which said insulative film is of varying thicknesses at the locations of different ones of said groups of electrodes, thereby defining said field varying means.

4. The target device of claim 3, in which said blue and green groups of electrodes are at least partially embedded in said insulative film.

5. The target device of claim 3, in which a concentration gradient of impurities of said one conductivity type in said substrate is provided at locations in registration with said group of blue electrodes.

6. The target device in claim 4, in which a concentration gradient of impurities of said one conductivity type in said substrate is provided at locations in registration with said group of blue electrodes.

UNITED STATES PATENT OFFICE
CERTIFICATE OF CORRECTION

Patent No. 3,609,399 Dated September 28, 1971

Inventor(s) Masafumi Hanaoka et al.

It is certified that error appears in the above-identified patent and that said Letters Patent are hereby corrected as shown below:

Column 4, line 32, claim 1, "strip-shaped" should read -- strip-line-shaped --.

Signed and sealed this 29th day of August 1972.

(SEAL)
Attest:

EDWARD M.FLETCHER,JR.
Attesting Officer

ROBERT GOTTSCHALK
Commissioner of Patents